United States Patent
Florencio et al.

(10) Patent No.: US 6,226,041 B1
(45) Date of Patent: May 1, 2001

(54) LOGO INSERTION USING ONLY DISPOSABLE FRAMES

(75) Inventors: Dinei Afonso Ferreira Florencio, Plainsboro, NJ (US); Ragnar Hlynur Jonsson, Reykjavik (IS)

(73) Assignee: Sarnoff Corporation, Princeton, NJ (US)

( * ) Notice: Subject to any disclaimer, the term of this patent is extended or adjusted under 35 U.S.C. 154(b) by 0 days.

(21) Appl. No.: 09/123,235

(22) Filed: Jul. 28, 1998

(51) Int. Cl.$^7$ .................................................. H04N 7/08
(52) U.S. Cl. ...................................... 348/473; 375/240.15
(58) Field of Search ................................. 348/473, 425.1, 348/426.1; 375/240.01, 240.15, 240.26

(56) References Cited

U.S. PATENT DOCUMENTS 6,005,643 * 12/1999 Morimoto et al. .................... 348/845
6,078,328 * 6/2000 Schumann et al. ................... 345/418
6,122,400 * 9/2000 Reitmeier ............................. 382/166

* cited by examiner

*Primary Examiner*—Victor R. Kostak
(74) *Attorney, Agent, or Firm*—William J. Burke

(57) ABSTRACT

When adding logos or other imagery to compressed digital video bitstreams, logos are inserted into only disposable frames. Since disposable frames are never used as references for decoding other frames, the logos can be added without adversely affecting the playback of any other frames. Preferably, the compressed data for disposable-frame macroblocks corresponding to the desired location for logo insertion are extracted from the compressed bitstream and replaced by intra-encoded logo-inserted data. As a result, logos can be inserted into compressed digital video bitstreams without having to completely decode and re-encode the bitstreams, while maintaining the overall quality of the video display.

24 Claims, 2 Drawing Sheets

LOGO INSERTION USING ONLY DISPOSABLE FRAMES

BACKGROUND OF THE INVENTION

1. Field of the Invention

The present invention relates to digital video, and, in particular, to the insertion of logos into a compressed digital video bitstream.

2. Description of the Related Art

In the broadcast of normal analog (e.g., NTSC or PAL) television programs, it is common practice for the local broadcaster to insert its station logo on the network feed, for example, in a corner of the video display to identify the station. This is particularly true for cable television programming. This allows viewers to identify quickly what they are watching as they "channel surf", especially in these days when cable operators re-map channel assignments on their cable spectrum. A similar technique has recently come into use for TV program ratings, so that parents can immediately identify the rating of the program being watched. Inserting logos and other imagery into an incoming stream is very important in today's video markets.

In future digital television systems, television programs will be transmitted from a central network to a local broadcaster as compressed digital video bitstreams conforming, for example, to an MPEG video compression standard. As is the case with uncompressed analog TV programming, it is desirable to enable local broadcasters to insert logos or other imagery into compressed digital video streams before broadcasting the TV programs to their customers.

SUMMARY OF THE INVENTION

The present invention is directed to a scheme for inserting logos or other imagery into compressed digital video streams. The invention avoids full decoding and re-encoding of the bitstream by replacing specific blocks or macroblocks with new imagery. In general, this would produce an unacceptable distortion in the video signal, due to the motion compensation. The present invention solves the propagation error by inserting the new material only in B-frames.

In one embodiment, the present invention is directed to the inserting of imagery into a compressed digital video bitstream, wherein the imagery is inserted into only disposable frames in the compressed digital video bitstream to generate an imagery-inserted compressed bitstream.

BRIEF DESCRIPTION OF THE DRAWINGS

Other aspects, features, and advantages of the present invention will become more fully apparent from the following detailed description, the appended claims, and the accompanying drawings in which:

DETAILED DESCRIPTION

Figure 1:
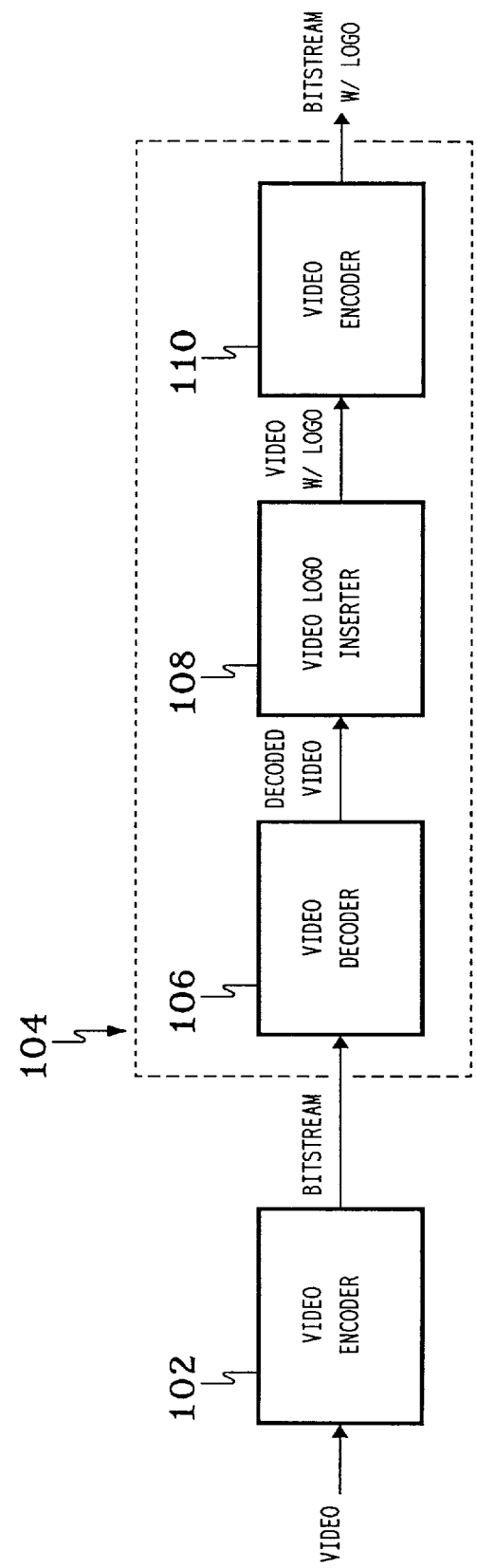
FIG. 1 shows one possible scheme for inserting logos or other imagery into compressed digital video streams.

FIG. 1 shows one possible scheme for inserting logos or other imagery into compressed digital video streams. According to FIG. 1, a video encoder 102 located, for example, at a central network compresses a video signal (analog or digital) to generate a compressed digital video bitstream which is then transmitted to a special video processor 104 at a local broadcaster. Video processor 104 comprises a video decoder 106, a video logo inserter 108, and a video encoder 110, all of which operate to insert a logo or other imagery into the compressed digital video stream received from the central network.

In particular, video decoder 106 decodes the compressed digital video bitstream to generate a decoded video stream. At a certain level, video decoder 106 may be said to reverse the compression processing implemented by video encoder 102 at the central network.

Video logo inserter 108 inserts a logo or other desired imagery into the decoded video stream to generate a video stream with an inserted logo. Depending on the implementation, video logo inserter 108 works in either the analog domain or the digital domain. If analog, then video logo inserter 108 can be identical to the existing components currently used to insert logos into analog television programs. If digital, then video logo inserter 108 can operate in the pixel domain to overlay or blend the pixels of the logo with the pixels in the decoded video signal to generate digital video with an inserted logo.

In any case, video encoder 110 recompresses the video with the inserted logo to regenerate a compressed digital video bitstream corresponding to the video with the inserted logo. This logo-inserted bitstream is then broadcast by the local broadcaster to its customers.

In video compression algorithms, such as MPEG, a video sequence is encoded using different types of video frames. A key frame (also known as an intra or I frame) is a frame of video data that is encoded using only intra-frame encoding techniques without reference to any other frames. A predicted or P frame is a frame of video data that may be encoded using inter-frame encoding techniques, such as motion estimation, motion compensation, and inter-frame differencing, with reference to at least one other frame. In addition, a P frame may itself be a reference used to encode another frame. Like P frames, a disposable or B frame is a frame of video data that may be encoded using inter-frame encoding techniques with reference to at least one other frame. Unlike P frames, however, a B frame is never used as a reference for encoding another frame. As such, a B frame can be dropped from a video sequence without adversely affecting the playback of other frames; thus, the name disposable.

Video compression algorithms like MPEG encode video frames based on regions of pixels called blocks and macroblocks. For example, transforms such as the DCT transform are typically applied to (8×8) blocks of pixel data (i.e., either the pixels themselves or motion-compensated inter-frame pixel differences), while motion estimation and motion compensation are typically applied to (16×16) macroblocks of pixels. In motion-compensated inter-frame differencing, for a non-zero motion vector, a macroblock in one frame is encoded with reference to a (16×16) region of another frame that has a location within that frame that is different from the location of the macroblock in the first frame.

One advantage to the logo insertion scheme of FIG. 1 is that changes to each video frame due to the insertion of the logo are taken into account when the logo-inserted video is compressed by video encoder 110. For example, changes to the logo areas in both key and predicted frames will be taken into account when motion estimation and motion-compensated differencing are performed during the encoding of both predicted and disposable frames.

There are, however, a number of drawbacks to this scheme for inserting logos into compressed digital video bitstreams. First of all, the scheme requires expensive equipment to completely decode and then re-encode the video stream. In addition, compression algorithms such as MPEG are lossy algorithms that rely on quantization and other steps that can adversely affect the quality of the decoded video. As such, the additional decoding and re-encoding steps in this scheme will only further diminish the quality of the final decoded video display at the customer.

The present invention is directed to an alternative scheme for inserting logos and other imagery into compressed digital video bitstreams such as those conforming to an MPEG video compression standard. According to this scheme, a logo is inserted into only disposable frames in the compressed bitstream. Since no other frames are encoded based on disposable frames, the changes to those frames due to the insertion of the logo will not affect the playback of any other frames in the compressed bitstream. Moreover, in preferred embodiments, only the encoded data corresponding to the affected macroblocks in the disposable frame need to be processed. As a result, the present invention provides a scheme for inserting a logo into a compressed digital video bitstream without having to decode completely the entire compressed digital video bitstream at the local broadcaster.

Figure 2:
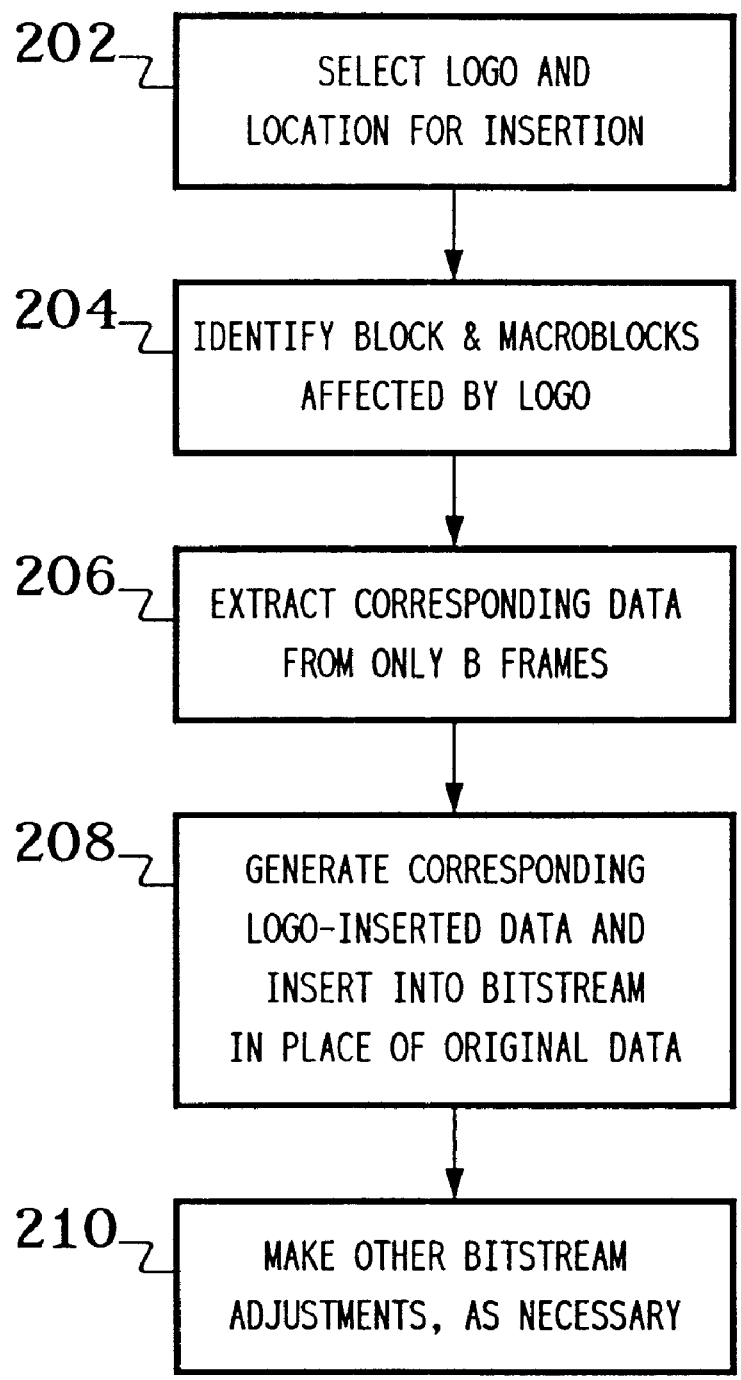
FIG. 2 shows a flow diagram of the processing involved in inserting logos or other imagery into compressed digital video bitstreams, according to one embodiment of the present invention.

FIG. 2 shows a flow diagram of the processing involved in inserting logos or other imagery into compressed digital video bitstreams, according to one embodiment of the present invention. After selecting the logo and the desired location for its insertion in the video display (step 202 of FIG. 2), the blocks and macroblocks in the video display that will be affected by the logo are identified based on the size of the logo and its desired location (step 204). The encoded data for only the disposable frames in the compressed digital video bitstream that correspond to the identified blocks and macroblocks are then extracted from the bitstream (step 206) and replaced with corresponding logo-inserted encoded data (step 208), where the logo-inserted encoded data corresponds to blocks of intra-encoded pixels representing the logo.

Depending on the particular implementation, there are different ways of generating the logo-inserted encoded data. For example, in some implementations, the logo-inserted encoded data is completely independent of the corresponding encoded data in the original compressed bitstream. In these implementations, the logo effectively replaces the corresponding macroblocks in the disposable frames of the original video display. In other implementations, the logo is blended with the original video data to achieve a more subtle insertion of the logo into the video display. This blending can be implemented at the pixel level or at the transform coefficient level. If at the pixel level, then the corresponding encoded data from the disposable frames need to be decoded all the way to pixels, which may then be blended (e.g., by weighted averaging) with pixels corresponding to the logo to generate blended pixels which are then recompressed to generate the logo-inserted encoded data. This process may require the application of an inverse (e.g., DCT) transform to recover the pixels from the original encoded data as well as the application of the forward transform to generate the logo-inserted encoded data from the blended data. If it is desirable to avoid the processing required by the application of inverse and forward transforms, in alternative implementations, the blending can be applied directly to the transform coefficients (without having to apply the inverse and forward transforms). In any case, the resulting logo-inserted encoded data is inserted back into the compressed bitstream in step 208 in place of the original encoded data that was extracted during step 206.

If necessary, other adjustments are also made to the compressed bitstream (step 210). For example, the replacement of the original encoded data with the logo-inserted encoded data may affect certain characteristics of the bitstream, such as byte alignment or bitrate. Moreover, in some cases, some additional blocks of the original encoded data may have to be dropped or simplified to compensate for insertion of the intra-encoded logo-inserted data, since intra-encoded blocks tend to require more bits to encode than inter-encoded blocks.

Under the present invention, if the logo boundaries coincide with macroblock boundaries and if the logo is opaque, then the inserted signal is not dependent on the incoming signal and therefore no decoding of the incoming signal is needed. In this case, since the logo is intra-encoded, the encoded data for the logo can be pre-computed (i.e., pre-encoded). As such, very limited processing will be needed to be performed in real time. Whenever the above conditions are not satisfied, some partial decoding of the incoming bitstream may be needed, but it will be restricted to the part of the image that will be affected by the logo.

Since, according to the present invention, the logo is inserted into only disposable frames, the logo will not be present in every frame. As a result, there will be some flickering effect between disposable frames with logos, on the one hand, and key and predicted frames without logos, on the other. This flickering effect will be less noticeable at higher frame rates, or when the number of disposable frames is relatively high. Moreover, the simplicity and low cost of the present invention provides advantages over other solutions that may alleviate the flickering effect. The present invention may have particular applications during emergency message insertion at the local level (e.g., for weather warnings and the like). Another application may be in signaling unauthorized access, where the quality of the decoded signal is not important and where any annoyance created by the flickering may be desirable. Yet another application may be in the artistic use of a moving logo, where the flickering can be disguised or attenuated by the moving nature of the image.

The present invention can be implemented using a logo-insertion processor having a block diagram similar to that of processor 104 of FIG. 1, although, under the present invention, the video decoder and video encoder can be greatly simplified, since they are not required to completely decode and re-encode, respectively, the entire compressed bitstream.

Although the present invention has been described in the context of video compression schemes conforming to an MPEG video compression standard, those skilled in the art will understand that the present invention can also be implemented in the context of other suitable video compression schemes.

The present invention can be embodied in the form of methods and apparatuses for practicing those methods. The present invention can also be embodied in the form of program code embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. The present invention can also be embodied in the form of program code, for example, whether stored in a storage medium, loaded into and/or executed by a machine, or transmitted over some transmission medium, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits.

It will be further understood that various changes in the details, materials, and arrangements of the parts which have been described and illustrated in order to explain the nature of this invention may be made by those skilled in the art without departing from the principle and scope of the invention as expressed in the following claims.

What is claimed is:

1. A method for inserting imagery into a compressed digital video bitstream, comprising the steps of:
   (A) identifying disposable frames in the compressed digital video bitstream; and
   (B) inserting the imagery into the compressed digital video bitstream to generate an imagery-inserted compressed bitstream, wherein the imagery is inserted into only one or more of the disposable frames in the compressed digital video bitstream to generate the imagery-inserted compressed bitstream.

2. The invention of claim 1, wherein step (B) comprises the steps of:
   (a) extracting encoded data from a disposable frame in the compressed digital video bitstream, wherein the encoded data corresponds to a desired location for the imagery; and
   (b) replacing the extracted encoded data in the compressed digital video bitstream with imagery-inserted encoded data corresponding to the imagery to generate the imagery-inserted compressed bitstream.

3. The invention of claim 2, wherein step (b) further comprises the steps of:
   (1) at least partially decoding the extracted encoded data to generate at least partially decoded data;
   (2) blending the at least partially decoded data with imagery data to generate imagery-inserted data; and
   (3) encoding the imagery-inserted data to generate the imagery-inserted encoded data.

4. The invention of claim 3, wherein the blending is implemented on pixels.

5. The invention of claim 3, wherein the blending is implemented on transform coefficients.

6. The invention of claim 3, wherein:
   the imagery-inserted encoded data is intra-encoded data;
   the imagery corresponds to a logo; and
   the compressed digital video bitstream is received by a local broadcaster from a central network and the imagery-inserted compressed bitstream is broadcast by the local broadcaster to its customers.

7. The invention of claim 2, wherein the imagery-inserted encoded data is intra-encoded data.

8. The invention of claim 1, wherein the imagery corresponds to a logo.

9. The invention of claim 1, wherein the compressed digital video bitstream is received by a local broadcaster from a central network and the imagery-inserted compressed bitstream is broadcast by the local broadcaster to its customers.

10. An apparatus for inserting imagery into a compressed digital video bitstream, comprising:
    (a) means for extracting encoded data from only disposable frames in the compressed digital video bitstream, wherein the encoded data corresponds to a desired location for the imagery; and
    (b) means for replacing the extracted encoded data in the compressed digital video bitstream with imagery-inserted encoded data corresponding to the imagery to generate an imagery-inserted compressed bitstream.

11. A computer-readable medium having stored thereon a plurality of instructions, the plurality of instructions including instructions which, when executed by a processor, cause the processor to implement a method for inserting imagery into a compressed digital video bitstream, the method comprising the steps of:
    (a) extracting encoded data from only disposable frames in the compressed digital video bitstream, wherein the encoded data corresponds to a desired location for the imagery; and
    (b) replacing the extracted encoded data in the compressed digital video bitstream with imagery-inserted encoded data corresponding to the imagery to generate an imagery-inserted compressed bitstream.

12. A method for inserting imagery into a compressed digital video bitstream, comprising the steps of:
    (a) extracting encoded data from only disposable frames in the compressed digital video bitstream, wherein the encoded data corresponds to a desired location for the imagery; and
    (b) replacing the extracted encoded data in the compressed digital video bitstream with imagery-inserted encoded data corresponding to the imagery to generate an imagery-inserted compressed bitstream.

13. The invention of claim 12, wherein step (b) further comprises the steps of:
    (1) at least partially decoding the extracted encoded data to generate at least partially decoded data;
    (2) blending the at least partially decoded data with imagery data to generate imagery-inserted data; and
    (3) encoding the imagery-inserted data to generate the imagery-inserted encoded data.

14. The invention of claim 13, wherein the blending is implemented on pixels.

15. The invention of claim 13, wherein the blending is implemented on transform coefficients.

16. The invention of claim 13, wherein:
    the imagery-inserted encoded data is intra-encoded data;
    the imagery corresponds to a logo; and
    the compressed digital video bitstream is received by a local broadcaster from a central network and the imagery-inserted compressed bitstream is broadcast by the local broadcaster to its customers.

17. The invention of claim 10, wherein means (b) further comprises:
    (1) means for at least partially decoding the extracted encoded data to generate at least partially decoded data;
    (2) means for blending the at least partially decoded data with imagery data to generate imagery-inserted data; and
    (3) means for encoding the imagery-inserted data to generate the imagery-inserted encoded data.

18. The invention of claim 17, wherein the blending is implemented on pixels.

19. The invention of claim 17, wherein the blending is implemented on transform coefficients.

20. The invention of claim 17, wherein:
    the imagery-inserted encoded data is intra-encoded data;
    the imagery corresponds to a logo; and the compressed digital video bitstream is received by a local broadcaster from a central network and the imagery-inserted compressed bitstream is broadcast by the local broadcaster to its customers.

21. The invention of claim 11, wherein step (b) further comprises the steps of:
(1) at least partially decoding the extracted encoded data to generate at least partially decoded data;
(2) blending the at least partially decoded data with imagery data to generate imagery-inserted data; and
(3) encoding the imagery-inserted data to generate the imagery-inserted encoded data.

22. The invention of claim 21, wherein the blending is implemented on pixels.

23. The invention of claim 21, wherein the blending is implemented on transform coefficients.

24. The invention of claim 21, wherein:
the imagery-inserted encoded data is intra-encoded data;
the imagery corresponds to a logo; and
the compressed digital video bitstream is received by a local broadcaster from a central network and the imagery-inserted compressed bitstream is broadcast by the local broadcaster to its customers.

* * * * *